United States Patent [19]
Weinblatt

[11] Patent Number: 5,635,901
[45] Date of Patent: Jun. 3, 1997

[54] ANTI-THEFT AUTOMOBILE SECURITY SYSTEM

[76] Inventor: Lee S. Weinblatt, 797 Winthrop Rd., Teaneck, N.J. 07666

[21] Appl. No.: 430,186

[22] Filed: Apr. 27, 1995

Related U.S. Application Data

[63] Continuation of Ser. No. 2,926, Jan. 11, 1993, abandoned.

[51] Int. Cl.$^6$ ............................................. B60R 25/10
[52] U.S. Cl. ........................ 340/426; 340/459; 307/10.4; 180/287
[58] Field of Search ................................ 340/426, 428, 340/429, 425.5, 427, 430, 459; 307/10.2, 10.3, 10.4; 180/173, 287

[56] References Cited

U.S. PATENT DOCUMENTS

| | | | |
|---|---|---|---|
| 3,735,346 | 5/1973 | Fox | 340/426 |
| 3,766,400 | 10/1973 | Walters . | |
| 3,781,789 | 12/1973 | Caleskie et al. | 340/430 |
| 3,784,839 | 1/1974 | Weber . | |
| 4,107,962 | 8/1978 | MacKinnon . | |
| 4,262,279 | 4/1981 | Dublirer | 340/430 |
| 4,302,747 | 11/1981 | Belmuth | 180/287 |
| 4,446,380 | 5/1984 | Moriya et al. . | |
| 4,485,887 | 12/1984 | Morano . | |
| 4,682,062 | 7/1987 | Weinberger . | |
| 4,838,377 | 6/1989 | Kozaki et al. . | |
| 4,857,888 | 8/1989 | Torres | 340/426 |
| 4,866,422 | 9/1989 | Dunnett et al. | 340/429 |
| 4,876,649 | 10/1989 | Kawai et al. | 340/426 |
| 4,901,054 | 2/1990 | Waterman . | |
| 4,910,493 | 3/1990 | Chambers et al. | 341/539 |
| 4,992,670 | 2/1991 | Pastor | 307/10.3 |
| 5,079,435 | 1/1992 | Tanaka . | |
| 5,276,728 | 1/1994 | Pagliaroli et al. | 340/539 |
| 5,315,286 | 5/1994 | Nolan | 340/430 |
| 5,360,997 | 11/1994 | Watson | 340/426 |
| 5,408,211 | 4/1995 | Hall | 340/426 |
| 5,412,370 | 5/1995 | Berman et al. | 340/426 |
| 5,438,311 | 8/1995 | Lane, Sr. | 340/426 |
| 5,463,372 | 10/1995 | Mawyer, Sr. | 340/426 |

*Primary Examiner*—Jeffery Hofsass
*Assistant Examiner*—Daniel J. Wu
*Attorney, Agent, or Firm*—Frishauf, Holtz, Goodman, Langer & Chick, P.C.

[57] ABSTRACT

First and second code comparators are sequentially responsive to keypad-entered first and second different codes. The first code enables operation of the engine. When a distance sensing device generates a signal representing traversal of a preset distance, this blocks the further operation of the engine based on the first code. The driver must enter a second code upon receipt of a warning that engine disablement is imminent. To prevent carjacking in which the driver is forcibly ejected from a car having its engine running in a normal operating mode, the driver surreptitiously trips a hidden switch as he exits the car. The hidden switch, which would typically be operated after both codes have been entered and with the engine running, resets the system. After a preset delay which is provided to permit the owner to reach safety from a carjacker, the system once again requires that the second code be inputted. The second code needs to be re-entered to keep the engine running. By this time the car will be sufficiently distant from the owner, and actuation of an alarm such as a siren encourages the carjacker to abandon the car at the time of such disablement.

20 Claims, 4 Drawing Sheets

ANTI-THEFT AUTOMOBILE SECURITY SYSTEM

This application is a continuation of application Ser. No. 08/002,926, filed Jan. 11, 1993 now abandoned.

BACKGROUND OF THE INVENTION

This invention relates to an automobile anti-theft security system and, more particularly, to engine operation control systems employing encoded inputs aimed at preventing loss of the automobile due to carjacking.

Numerous devices in the prior art provide anti-theft encoded systems using encoded signals. Some of these utilize a keypad to enter a code to enable the automobile ignition system. Others permit the engine to be started but include a device which, if not actuated at the beginning of the engine start procedure, will cut-off the engine in some manner. For example, U.S. Pat. No. 4,485,887 discloses a hidden switch which must be closed after the ignition key circuit is closed. If the hidden switch is not closed, then a time delay will cause the vehicle to stop running.

Other systems are known in which a turnover mode is provided. In the turnover type of systems, as shown in U.S. Pat. No. 3,766,400 for example, primary and secondary codes are utilized. The primary code is normally utilized, but by depressing two buttons the secondary code may be used instead when the vehicle is temporarily turned over to someone else. The secondary code permits unlimited starts of the engine for use by, for example, parking lot attendants or others. The primary code is used only by the owner and, therefore, is not compromised in revealing the secondary code to others.

In a further prior art system, as shown in U.S. Pat. No. 4,446,380, a door lock code and an ignition security code are used. If the doors are unlocked, only the ignition security code is needed to start the engine. Otherwise, both codes need to be entered.

In recent times, an increasing number of carjackings have been occurring. These involve forcibly stealing an occupied car. More specifically, while the car is occupied and operated by the driver, a person sometimes referred to as a carjacker forcibly takes over the vehicle from the owner who may be entering the vehicle or sitting in it while stopped at a traffic signal, for example. Those systems which require a code to be entered to start the engine or which provide an override switch to be operated at the beginning of vehicle operation are of no concern to the carjacker because, once actuated, they permit continued and uninterrupted operation by the driver. Under such conditions the carjacker can drive a long distance to a safe place unimpeded by the security system to where the car can be "chopped up" into parts for separate resale or where the security system can be removed in its entirety or permanently bypassed so that the car can be used intact. Many of the prior art systems suffer from this drawback of providing security only when starting the engine, but are incapable of protecting the vehicle from being stolen while it is being used by the rightful owner or an authorized driver. Also, if the carjacker notices a security system in the car, or if he approaches the owner while the car has not yet been started and is unable to start the engine while the owner is in the vicinity, he can coerce the owner to reveal the code. This represents a danger to that person's safety.

To summarize the above, presently available automobile anti-theft security systems provide security only in the initial stage of operating the car. Either turn-on of the engine will be prevented or the engine will be disabled a short time after it is started unless a switch is tripped or a proper code entered. However, once this stage of operation is completed, the car will operate indefinitely until the ignition switch is turned off or the car runs out of gas. If a carjacker steals a car after its initial operating steps to deactivate the security system have been performed by the rightful driver, the carjacker is free to drive off for destinations unknown. Also, if the carjacker notices that the car has a security system installed, he may force the owner to reveal the code, thereby placing that person's safety in jeopardy.

Further, in certain if not most security systems, the ignition wire extends into the passenger compartment just as when there is no installed security system. This presents an easy theft situation for a thief knowledgeable about wire "jumping," regardless of the code-type of security system in place.

A need exists to provide an automobile security system which will not compromise the safety of the driver at the hands of the carjacker, but yet will permit easy recovery of the car should a carjacker steal the car.

SUMMARY OF THE INVENTION

One object of the invention is to provide an improved automobile anti-theft security system.

Another object of the invention is to provide an automobile security system which prevents loss of a car due to carjacking.

A further object of the invention is to minimize the danger to which a driver is exposed during a carjacking.

Still another object of the invention is to inhibit the defeat of the security system by "jumping" wires in the passenger compartment.

These and other objects are attained by one aspect of the invention directed to an anti-theft method for an automobile, comprising the steps of enabling operation of an automobile engine by manually manipulating a first device to produce an engine enablement signal for causing the engine to operate continuously, and selectively actuating a second device in the automobile to disable further continuous operation of the engine unless the first device is manipulated to produce the engine enablement signal.

Another aspect of the invention involves an anti-theft method for an automobile, comprising the steps of producing a control signal for operating an automobile engine continuously in a normal operating mode, and selectively actuating a device in the automobile for disrupting the normal operating mode unless a prescribed operation is manually performed.

A further aspect of the invention involves an automobile anti-theft security system for precluding engine operation in accordance with one aspect of the present invention comprises engine enabling code means responsive to an encoded input signal for enabling operation of the engine. A manually operated switch means is unobtrusively placed in the automobile for selective operation by the driver of the automobile after the engine is enabled and running normally. The switch means includes means responsive to the activation thereof for disabling the operation of the engine, and for requiring entry of an encoded input signal to the code means for enabling further operation of the engine. Thus, the driver can secretly cause delayed disablement of the engine as the car is forcibly taken. In this way, the safety of the driver is not compromised by operation of the security system.

In accordance with a still further aspect of the invention, the engine enabling code means includes first and second code means, each for independently enabling the operation of the engine. The first code means includes engine disabling means arranged such that the second code means must be enabled subsequent to the enabling of the engine by the first code means to preclude disabling the engine. In this way the engine can be caused to stop later if the second code is not entered even though the engine is initially started with entry of the first code.

DETAILED DESCRIPTION OF THE INVENTION

Figure 1:
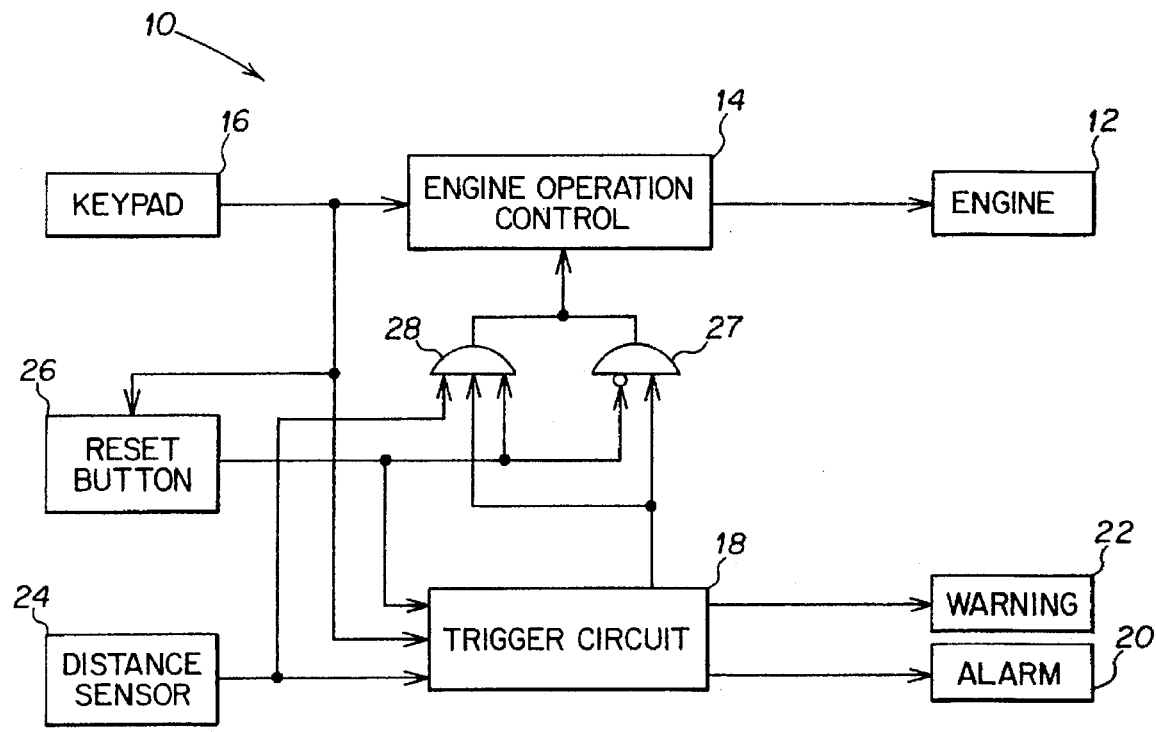
FIG. 1 is a block diagram of an automobile anti-theft security system according to one embodiment of the present invention.

Before proceeding to a detailed description of the invention, it may be beneficial to consider the various possible circumstances under which a car can be stolen (the words automobile, vehicle and car are used interchangeably herein).

(1) The car is unattended and is parked with its engine off. In this condition a thief can break into the car and somehow start the engine so he can drive off. A security system should be able to prevent the engine from being started and, if it is unable to do so, to at least prevent the automobile from being driven so far away that its recovery is unlikely.

(2) A parked car with its engine off is attended in the sense that a driver is in it or near it. It cannot simply be stolen under such circumstances without someone alerting the police or taking other measures against the thief. Consequently, under this circumstance a carjacking would occur in which the carjacker wields some sort of weapon while he starts the car and drives off. The weapon can also be used to force the owner to start the car or to reveal information about how the car can be started by defeating the installed security system. Nevertheless, the security system must be able to prevent the carjacker from driving very far despite the fact that the carjacker was able to start the car and drive off with it.

(3) The car is in its normal operating mode of being driven after the necessary steps called for by the security system have been performed by the driver. The car, with its engine running in the normal operating mode, is parked at a traffic light or standing for some other reason. Under these circumstances, a carjacker needs only to force the driver out, take over the wheel and drive off. The security system must provide some means to prevent the carjacker from getting too far away.

The security system should preferably have two additional features. Firstly, it should provide some means for starting the car and operating it for a short distance, such as in a parking lot, without the parking lot attendant having to be told of the details for operating the security system. Secondly, there should also be some means for permitting another driver to use the car by revealing some portion of how the security system is operated, but still retaining some information so that no one other than the owner knows all of the information required to operate the security system.

The present invention accomplishes the features described above by providing essentially three operating modes, namely (a) a starting mode,
(b) a normal running mode, and
(c) a reset mode.

As explained in detail below, the starting mode has an initial phase and a delayed phase which together prevents the first above-listed possibility. The initial phase prevents the engine from being started unless a certain action is taken, such as punching a specified code into a keypad. The delayed phase occurs after the engine is running. After a pre-set time interval has expired, or after a pre-set distance has been traversed by the car, the engine will be cut-off unless another action is taken by the driver, such as the punching in of another code. The delayed phase feature is also effective to prevent the second above-listed circumstance. Once the initial and delayed phases have been successfully completed, the car enters its normal running mode in which the engine can be operated and the car driven without being further hindered by the security system. The reset mode is initiated by the driver only in response to an attempted carjacking. By taking a certain action, as explained below, the driver can interrupt the normal running mode and cause the security system to require that a certain condition be met such as one of those originally required in the starting mode, namely entry of a specified code. Unless that is done, the car will be disabled. This is designed to address the third type of circumstance described above.

Turning now to FIG. 1, security system 10 is designed to control operation of engine 12. Engine operation control 14 provides operating current in the normal manner to the spark plugs. Alternatively, or in addition, it can also include a gasoline cut-off valve in the gasoline line to the engine which, if closed, will disable the engine. Thus, engine operation control 14 includes the mechanical and/or electromechanical devices for generating and distributing the engine current and/or for controlling the flow of gasoline to the engine. In addition, engine operation control 14 also includes the control circuitry for operating the ignition and/or fuel flow. These are conventional devices and, therefore, providing details thereof is not deemed necessary.

Engine operation control 14 also includes an inhibit circuit for preventing normal operation thereof unless a specified code is punched into keypad 16. The code can be a set of any alpha-numeric characters which is either pre-programmed at the factory or pre-set by the owner of the car. If the appropriate code is entered by the driver, then when the ignition key (not shown) is turned on, the engine operation control will operate normally to start engine 12 and to keep it running. This corresponds to the initial phase of the starting mode.

System 10 also includes a trigger circuit 18 which has a number of functions. Firstly, trigger circuit 18 is coupled to engine operation control 14 and inhibits its normal operation to cause engine 12 to stall by blocking current to the spark plugs and/or preventing gasoline from reaching the engine. Secondly, trigger circuit 18 activates alarm 20 which can be, for example, a siren or flashing lights which indicate that an abnormal condition exists. Thirdly, trigger circuit 18 actuates a driver warning device 22 which can be, for example, audible or visual. The audible signal can be a tone or it can be a verbal message. The visual signal can be a warning light, or it can be a visually displayed message.

Trigger circuit 18 is responsive to a signal from distance sensor 24 which occurs after a preset distance has been traversed to initiate a time delay and, at the same time, activate warning device 22. This corresponds to the delayed phase of the starting mode. When the warning is noticed by the driver, he has a predetermined period of time within which a certain action on his part is required in order to avoid engine cut-off. The time delay of trigger circuit 18 provides him with a sufficient amount of time to take the necessary measures. For example, this involves the entry of another code punched into keypad 16. The signal from keypad 16 is coupled to trigger circuit 18 to terminate the engine cut-off sequence which began with the signal from distance sensor 24. Consequently, if the correct code is punched into keypad 16, trigger circuit 18 will have no effect on engine operation control 14 which continues to operate normally.

Distance sensor 24 is capable of determining when a pre-set distance has been traversed following a certain event. That event can be, for example, the location at which the engine 12 was started or where the transmission gear shift lever is placed into Drive. When the pre-set distance has been traversed, distance sensor 24 provides an output signal indicative thereof. When this signal is applied to trigger circuit 18, it causes the actuation thereof, as described above. In other words, system 10 calls for entry of the second code after the car has moved off by a certain distance from its starting point. Unless this code is entered, engine 12 will be cut-off so that further movement of the car is stopped.

Once the second code is punched into keypad 16, the security system passes from its above-described starting mode to the normal running mode. No further function will be performed by the security system unless the ignition switch is turned off and then turned back on at some future time. This resets the system so that it proceeds once more to its starting mode.

Reset button 26 of system 10 is placed in the passenger compartment of the car in such a place where it can be unobtrusively but readily actuated by the driver, particularly as he is exiting the car under duress. Such a position could be on the side of the steering column, or the front wall of the seat, on the driver side arm rest, on the middle console, or the like. Reset button 26 provides a signal to actuate trigger circuit 18 into its above-described operation of expecting the input of the second code within a predetermined time period to avoid engine cutoff. In other words, reset button 26 simulates the above-described signal from distance sensor 24. Depressing button 26 changes its low output to high, and the high output is latched until the second code is punched into keypad 16 (latch not shown). System 10 is provided with a capability of responding to actuation of reset button 26 based on the output of distance sensor 24.

More specifically, actuation of reset button 26 by the driver must be such as to cause a risk to the driver's safety. Consequently, the effect of doing so must be delayed until the driver has an opportunity to get away from the car, or the car is driven away by the carjacker. Distance must be placed between the driver and the carjacker before the carjacker realizes that the security system is once more operational and about to cut-off the engine. Otherwise, the driver will still be accessible to the carjacker for intimidation and/or retribution. Normally, it is expected that the carjacker will quickly try to get away. Therefore, reliance on the time delay of trigger circuit 18, as described above, will produce the desired distance separation. However, it is possible that the carjacker will not leave the scene quickly and, instead, will proceed to rob the driver. In such a case, the time delay will expire with the driver possibly still exposed to personal danger. Consequently, the time delay of trigger circuit 18 should be combined with the distance sensor to cutoff engine 12 based on the later occurring event, namely expiration of the time delay of trigger circuit 18, or traversal of the distance set into sensor 24.

This is accomplished by using AND gates 27 and 28. One input of AND gate 27 receives the output of trigger circuit 18, and an inverting input thereof receives the output of reset button 26. When the output of reset button 26 is low, as is normal, AND gate 27 will open to pass a high output of trigger circuit 18 when it occurs. When button 26 is depressed, and its output is latched high, AND gate 27 is disabled. Therefore, engine operation control 14 is operable via AND gate 28 which has been disabled up to that point by the low output of button 26. AND gate 28 will open when both of the outputs of trigger circuit 18 and distance sensor 24 are high. Thus, the opening of AND gate 28 for passing the output of trigger circuit 18 therethrough is controlled by the later one of the outputs of trigger circuit 18 and distance sensor 24 to occur. Consequently, if the carjacker delays his getaway, the driver's safety is not endangered because cutoff of engine 12 will not occur anyway unless the preset distance has been traversed.

Once engine 12 is cut off due to actuation of reset button 26, the car cannot simply be restarted by turning the ignition switch off. The engine cutoff condition is latched until the second code is inputted. The output of reset button 26 then goes low, and AND gate 28 is closed.

Figure 2:
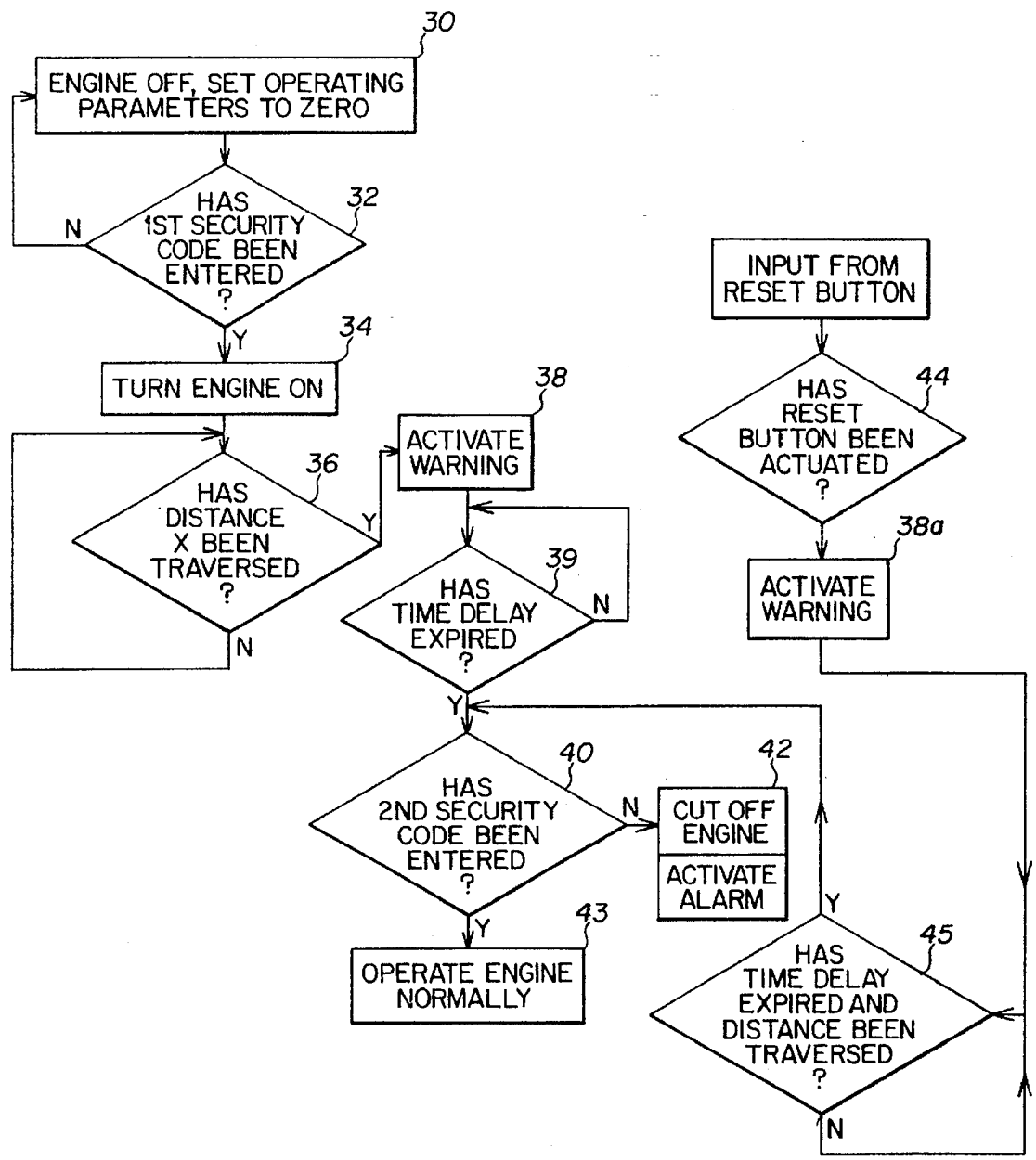
FIG. 2 is a flow chart showing the steps of operating the system of FIG. 1.

FIG. 2 is a flowchart which shows the various steps carried out by system 10. More specifically, with the engine off the system parameters are initialized in step 30 to zero. This can be done either when the ignition key is turned to "off" at the end of vehicle operation or when the next time that it is turned to "on" at initiation of vehicle operation. Step 32 determines whether the first security code has been punched into keypad 16. As described above, this determination can be made by appropriate circuitry in engine operation control 14. If the first security code has not been entered, then system 10 simply returns operation to its initiating step 30. If, however, the first security code has been entered, and the ignition key is turned on, the engine is started as per step 34. Step 36 then senses whether the specified distance has been traveled, as determined by distance sensor 24. If not, then step 36 continues to cycle. When the distance sensor 24 provides an indication that the preset distance has been covered, step 38 activates driver warning device 22. Step 39 determines whether the preset time delay of trigger circuit 18 has expired. As long as it has not, step 39 keeps recycling. Once the delay has expired, step 40 determines whether the second security code has been punched into keypad 16 within the allotted time delay. If not, then the engine is cut-off per step 42 and the alarm 20 is triggered. If, however, the second security code has been entered, then step 43 operates the engine normally via engine operation control 14. If, however, step 44 determines that the reset button 26 has been pressed, the operational flow is directed to step 38a in which driver warning device 22 is activated. Step 45 checks whether the time delay of trigger circuit 18 has expired and whether the preset distance has been traversed. If not, then step 45 continues its cycling. However, when both signals are detected (as by AND gate 28), then step 40 checks whether the second code has been entered and, if it has not, then the engine is cut off and alarm 20 is activated.

With the automobile operating in its normal running mode, let us now presume that a carjacking incident occurs and the driver is forced out of the automobile. As explained above, reset button 26 is provided for just such an eventuality. This button is of an unobtrusive shape and size, and is located in such a position within the passenger compartment that the driver can surreptitiously reach over and press it without any possibility that the carjacker will notice. As the driver depresses reset button 26 while being forced to exit his automobile, a resulting signal is generated to trigger circuit 18. This signal causes trigger circuit 18 to have engine operation control 14 cut-off engine 12 unless the second code is punched into keypad 16 within the allotted time delay or until the preset distance is traversed. In other words, the system 10 which is in its normal running mode is reset by actuation of button 26 into once again hindering operation of the automobile unless certain measures are taken by the driver. Thus, security system 10 becomes active once more in protecting the automobile even though all of the steps for placing the security system in its normal running mode had previously been performed and thereby rendered the security system inactive in protecting the automobile.

Figure 3:
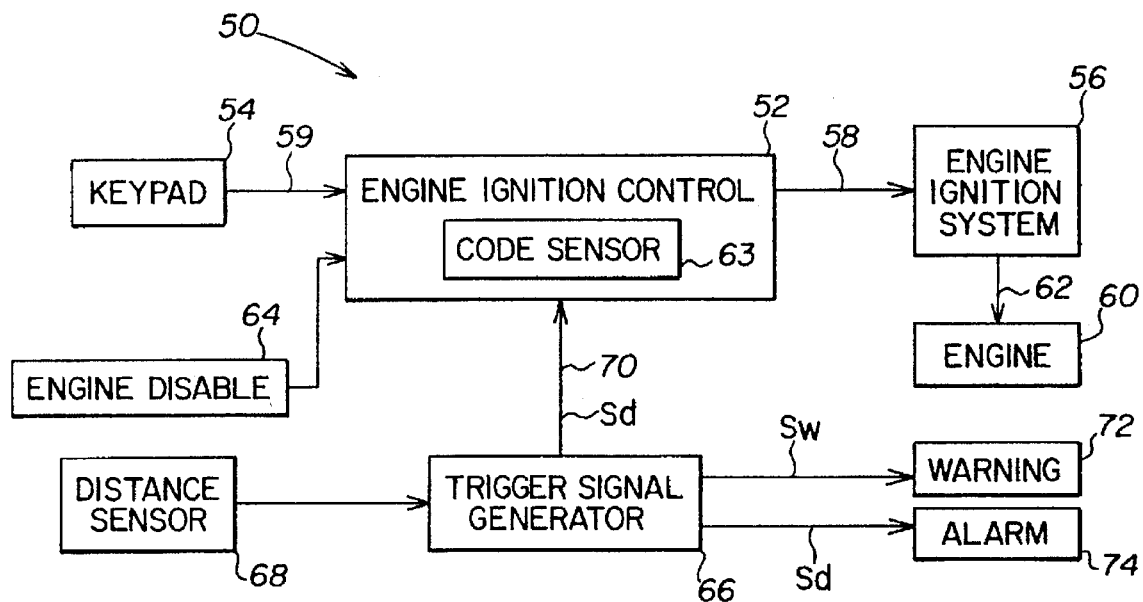
FIG. 3 is a general block diagram of a circuit according to a second embodiment of the present invention.

Another embodiment of the invention will now be described. In FIG. 3, anti-theft system 50 comprises an engine ignition control 52 which, in response to a code entered via keypad 54 onto wire 59, generates an engine operating signal for operating the engine ignition system 56. The engine ignition system 56 is conventional and comprises, for example, a conventional computerized engine operating system. However, the ignition current is not coupled between control 52 and system 56, the system 56 being operated by a low power signal generated by control 52 on wire 58. Wire 59 is inside the passenger compartment. A thief who attempts to "jump" wire 59 will not be able to activate the ignition system 56 because, without the proper code being entered by keypad 54 and detected by code sensor 63, engine ignition system 56 will not operate. The ignition system 56 once enabled by an appropriate signal on wire 58 will generate the conventional engine operating power current on wire 62 for engine 60. Wires 58 and 62 are not readily accessible to a thief because they are in the engine compartment. The keypad 54 and a code sensor 63 of control system 52 may be conventional. Code sensor 63 represents one or more such sensors. Two sensors are employed in the preferred embodiment. It should be understood that single wires shown in the drawing may represent multiple wire busses. Ignition can be initiated just by keypad 54, or this can be done jointly with an ignition key (not shown here but shown in FIG. 4). In other words, the signal from an ignition key to engine ignition control 52 will be ignored unless the correct code is punched into keypad 54.

System 50 further includes a manually operated engine disable device 64 which can be a reset button, for delayed disablement of the signal appearing on wire 58. Device 64 is located in the passenger compartment of the car, preferably secretly located on or near the steering wheel, as described above for reset button 26. When the device 64 is actuated by the driver, while the engine is running and the security system operating in its normal running mode, control 52 disables the signal on wire 58 at a given time after the device 64 is operated. For example, this time delay may be one or more minutes.

The purpose of device 64 is to enable the driver to surreptitiously reset the security system. Should the driver be accosted at a traffic signal by a carjacker and be forced to give up the car, the driver can secretly activate device 64 while exiting the car. When the carjacker operates the car, the time delay set by device 64 is initiated and, at the end of the set delay period, the engine ignition control 52 is reset to its initial state and the engine ignition operating signal on wire 58 is disabled, thus disabling engine 60. By this time the carjacker will have driven the car sufficiently far so that the driver is safe from retribution and/or from being coerced to reveal information.

System 50 further includes a trigger signal generator 66. Generator 66 is responsive to distance sensor 68 for generating an engine disabling signal Sd on wire 70 applied to control 52. In particular, signal Sd resets the control 63, which removes the signal on wire 58, thereby disabling ignition system 56. In response to the distance sensor 68, generator 66 also activates via signal Sw a warning display 72 on the vehicle dashboard, or in the alternative or in conjunction therewith, an audio warning signal. A delay circuit in generator 66 delays the generation of signal Sd for a period subsequent to generating a warning signal Sw applied to display 62. The signal Sd is also applied to an alarm 74. The alarm 74 may be an audio alarm, e.g., a siren or other loud sound generator, and/or additional alarm devices such as door lock activating signal, steering wheel locking device and so on.

Upon activation of the warning display 72 (or device), the legitimate driver knows that it is necessary to re-enter the prescribed code to control 52 via keypad 54. The delay between activation of signal Sw and Signal Sd is set so as to be sufficient to give the driver adequate time to re-enter the code. This may be, for example, approximately one minute depending on a particular implementation. If the proper code is not entered, then signal Sd causes the engine to be disabled.

This sequence involving operation of generator 66 occurs automatically when a preset distance is sensed by sensor 68. The distance may be a fraction of a mile or one or more miles according to a given implementation. Thus, if a car thief demands the car from the owner who has just entered the car and is about to drive off, the owner merely leaves the car without danger. If the thief demands the starting code, this can be given to him since disablement will still occur after the required distance is traveled by the car. When the warning appears, the carjacker will not know what is happening, and when the engine stops and alarm 74 goes off the carjacker will abandon the car.

Figure 4:
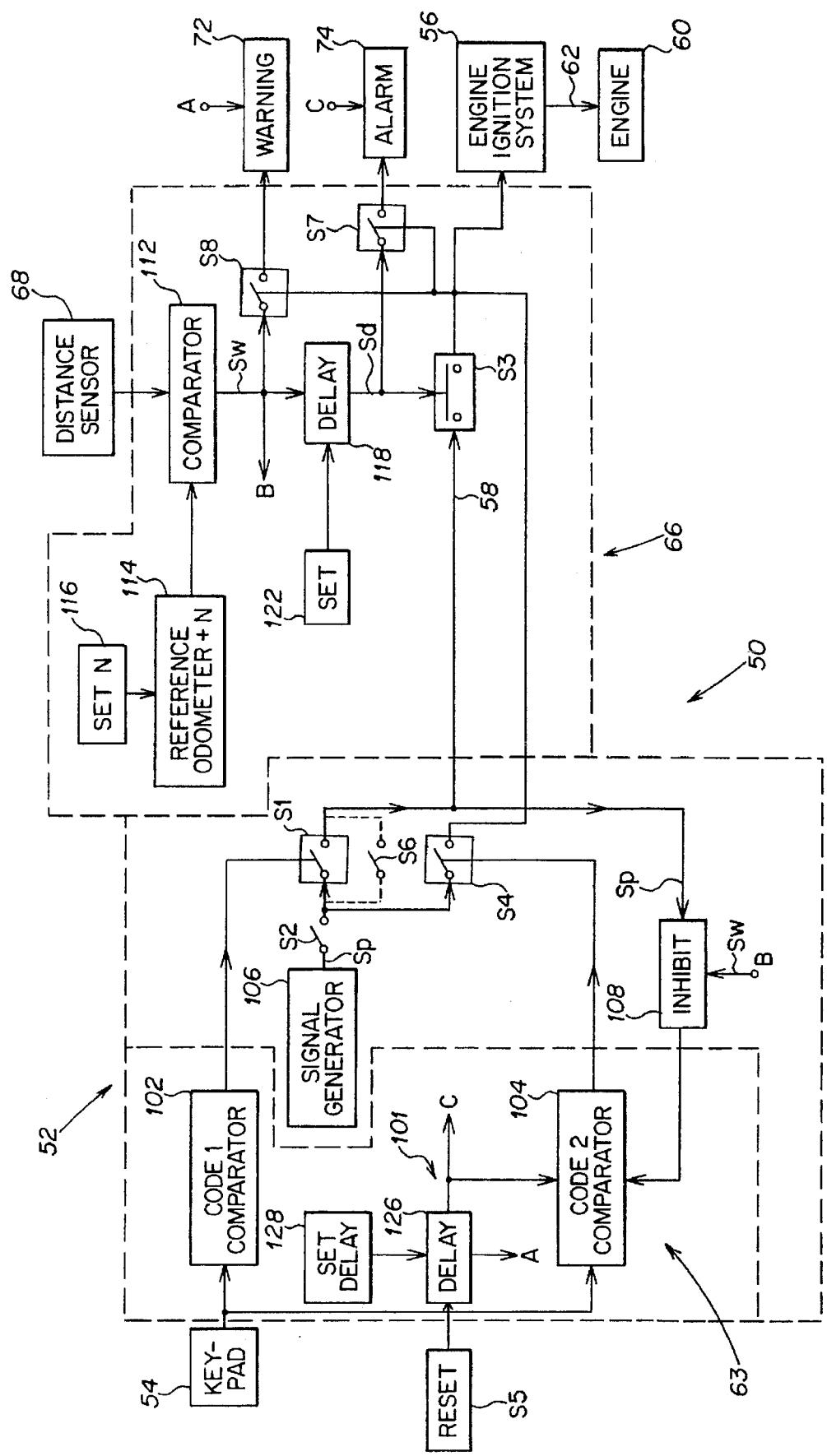
FIG. 4 is a detailed block diagram of the second embodiment.

However, to prevent the carjacker from using the starting code to preclude disablement of the car when the warning is indicated, system 50 includes two code sensor circuits, each operating on a different code so that knowledge of one code to start the engine will not be sufficient to prevent later disablement in response to the sensed distance signal. FIG. 4 shows the details of such an arrangement.

In FIG. 4, system 50 includes engine ignition control 52 and trigger signal generator 66. Keypad 54 generates at its output the manually entered code. This code is applied to code 1 comparator 102 and to code 2 comparator 104. Comparators 102 and 104 are similar to each other. The comparators each include a stored code which is to be matched by the keypad entered code. In response to an applied code from the keypad, the comparators each output a signal representing a match. Code 1 is different from code 2. These comparators may all be conventional devices.

When code 1 is matched by the keypad entry, comparator 102 produces an output that is applied as a switch control for closing normally open electronic switch S1. The output is latched, e.g., by a multistable device (not shown), to keep S1 closed. The device resets to its initial state when system power is removed, such as when the ignition key is turned off, thereby placing S1 in the open state.

A signal generator 106 applies a low power signal Sp through normally open ignition key operated switch S2, switch S1 and normally closed electronic switch S3 to engine ignition system 56. Switch S2 is operated by the driver using an ignition key of conventional design. However, S2 merely applies the engine ignition signal to S1 and, thus, bypassing or "jumping" switch S2 by a car thief will not apply the ignition signal to the engine ignition system 56 if S1 remains open. A hidden manual override switch S6, whose position in the vehicle is only known to the owner, is optional to permit the owner to selectively bypass S1 to let others drive the car without knowing the code 1. This does not compromise codes 1 or 2. The code 2 is still essential for operating the engine for the long term as will become clear from the explanation provided below and, importantly, precludes a thief from getting very far with the car even though code 1 is not needed, as when S1 is bypassed, or when it somehow becomes known by the unauthorized driver.

The comparator 104, which may be identical to comparator 102, generates an output signal in response to receiving the correct code 2 from keypad 54 and applies this output signal to normally open electronic switch S4 which closes in response thereto. Closed switch S4 couples the junction of switches S2 and S1 to the input of engine ignition system 56, thereby applying signal Sp to system 56 for operating the engine.

Inhibit circuit 108 is responsive to the simultaneous inputs of signal Sp and signal Sw (at terminal B from trigger signal generator 110) for enabling comparator 104. Normally, the inhibit circuit 108 disables comparator 104. For example, terminal B and signal Sp may be connected to the input of an AND gate (not shown) in inhibit circuit 108. The comparator 104 may include a latch (not shown) whose state is set by the output of circuit 108, the latch normally disabling the output of the comparator 104 until the AND gate is made active by the presence of both signals Sw and Sp. When the AND gate is made inactive, the latch returns to the disabling mode.

The inhibit circuit 108 prevents the code 2 comparator 104 from operating the engine if code 2 is accidentally entered when attempting to enter code 1. This ensures that only the proper sequential operation of comparator 104 after the operation of comparator 102 is recognized because signal Sp cannot be applied to inhibit circuit 108 unless comparator 102 first receives code 1. The signal Sw at terminal B does not allow the inhibit circuit to become active until the distance sensor 78 indicates that a predetermined distance has been traveled by the car from where the system 50 was enabled. This precludes the switch S4 from being closed immediately after Sp is generated by the closed switch S1 and prematurely overriding the effect of switch S3, as explained below. Thus, both signal Sp and signal Sw are required to cause the inhibit circuit 108 to enable comparator 104. Consequently, comparator 104 is not responsive to the input of a correct code 2 unless it is entered by keypad 14 after signal Sw is generated and with signal Sp also being present. Thus, entering code 2 to comparator 104 does not close switch S4 unless the required distance set by device 116 (as explained below) is reached. At such time, entering the correct code 2 causes comparator 104 to output a control signal to switch S4 which applies signal Sp to the ignition system 56.

In the trigger signal generator 66, comparator 112 receives the sensed distance traversed by the car as indicated by a signal generated by sensor 68. Sensor 68 is an electronic odometer which produces a digital signal representing the current odometer reading of the vehicle. A reference signal generator 114 is responsive to the current odometer reading when the ignition is turned on and adds to this reading a preset value N which can be set by a manually operated control 116. The operator of the vehicle sets the value of N which may be a fraction of a mile, e.g., tenths, or in miles. This value of N, which can also be factory pre-set, is automatically added to the current odometer reading to provide a fixed reference distance value to which the reading of sensor 68 is compared. When a match occurs, trigger signal Sw is generated. The output of reference signal generator 114 remains fixed by operation of control 116 and does not increment as the odometer reading changes during normal car travel. Device 116, however, inputs a new odometer reading when initially activated upon the ignition key being turned to "on".

Signal Sw is applied to delay circuit 118 and also to warning device 72 which may be a flashing light, a buzzer, a message display, an audible message or any combination thereof. The delay interval of delay circuit 118 is set by a control 122. This control 122 sets the delay interval for applying signal Sw to normally-closed switch S3. Signal Sw applied to the control terminal of S3 opens this switch thereby disabling the engine 124, assuming that switch S4 is open at this time. Delay 118 may be 30 seconds, for example, to allow the driver of the car sufficient time to enter code 2.

As an alternative to inhibit circuit 108, an inhibit means (not shown) can serve as an electronic switch in circuit between the comparator 104 output and the control of switch S4. In this case the applied signals Sw and Sp close the normally open inhibit means. The comparator 104 can thus be enabled at any time whenever the correct code 2 is applied, but its output is blocked from reaching switch S4 by such inhibit means until it is enabled by the presence of both signals Sp and Sw. In this case, code 2 entered before entry of code 1 would be effective for enabling comparator 104, but it cannot close S4 until signals Sw and Sp are present. This approach insures that the comparator 104 can receive the code 2 prior to the required distance being traversed. This may be advantageous in certain implementations since pre-entering the code 2 automatically disables the effect of S3 by overriding this switch because as soon as signal Sw is generated, switch S4 is closed. This permits a driver to selectively disable switch S3 during the engine start-up while the car is still parked by pre-entering code 2 prior to the generation of signal Sw so that he does not have to do so while driving. If a thief takes the car, reset switch S5 is activated to thus disable comparator 104, as explained below.

Delay circuit 118 insures that the driver has sufficient time to enter the code 2 prior to the engine being disabled by the opening of switch S3. This delay can be preset by the operator to meet his particular ability to enter the code via keypad 54 while driving the car.

The description up to this point has dealt with how the security system is designed to prevent theft of a parked car by setting up a starting mode which requires entry of codes to activate the ignition system. Once this is done, the car is in its normal running mode which allows it to continue running until its ignition key is turned to the "off" position or in the unlikely event that the car runs out of gas. However, if the car is in its normal running mode, it is vulnerable to carjacking, as explained above. After the carjacker forcibly ejects the driver from the car, he can drive the car without regard to the security system since he knows that it must have already been deactivated. The carjacker realizes that he may have to contend with it at a later time, but for now he can make his getaway safely and unimpeded, and the owner is unlikely to see his car again.

As explained above, a system is needed which prevents the carjacker from traveling very far but which, at the same time, avoids placing the ejected driver in greater danger for his personal safety. In other words, if the car were to be disabled while the carjacker still has the driver within his immediate proximity, he can coerce the driver to reveal what needs to be done to place the car in its normal operating mode. Therefore, the carjacker must be allowed to drive a short distance away thinking that everything in the car is operating normally. In the meanwhile, the driver is removed from danger. However, the car cannot be allowed to be driven far. It is, thus, kept in the vicinity and can be easily recovered.

To this end, ignition control 101 is provided. It is operated by a suitably located (as explained above regarding reset button 26) reset button S5. This button is normally open. When closed it operates delay circuit 126 which generates a delayed disabling signal applied to comparator 104 so that its output changes state, thereby opening switch S4. Opening switch S4 removes the signal Sp from the engine ignition system 56, thereby disabling engine 60. The delay interval of delay circuit 126 can be preset by the driver via delay setting device 128 which may be a potentiometer. The delay circuit 126 may be a delay line, for example, having a tap for generating a delayed signal at terminal A prior to generating the delayed signal which is applied to comparator 104. The signal at terminal A is applied to warning device 72 ahead of the operation of switch S4 so that if switch S5 is accidentally activated, the authorized driver can re-enter code 2 to prevent the engine from being disabled.

Suppose the driver is accosted by a carjacker at a traffic signal and ordered out of the vehicle. The engine 60 is running normally and the carjacker expects to take the car and drive off without encountering any problems. However, upon exiting the car, the driver depresses button S5 surreptitiously without knowledge of the carjacker. The delay duration of delay 126 is sufficient to permit the carjacker to drive off so that the driver has time to seek help or even follow at a safe distance behind the car knowing that shortly thereafter the car will stall. With the time delay of delay circuit 126 running, the carjacker can operate the car until the delay interval runs out at which time comparator 104 is disabled and switch S4 opens, thereby stopping engine 124. While a warning will have in the meantime been provided by device 72, the carjacker will have no knowledge as to its meaning and/or will not know the correct response. Once the engine stops due to actuation of button S5, the only way for the thief to restart it is to enter code 2 so that comparator 104 would once more close switch S4. After the delayed signal of delay circuit 126 is generated, it can also be applied to alarm 74 via terminal C. The sounding of a horn and/or flashing of lights, for example, by alarm 74 places pressure on the carjacker to quickly abandon the stalled car and get away to safety.

There, thus, has been described an automobile anti-theft security system which permits a car owner to safely retreat from a carjacker who takes the car from him when it is being first started or while it is in a normal operating mode after all codes have been entered. When the car is first started, even if the carjacker demands code 1 he will not be aware of the necessity of knowing code 2. When he drives off, the distance sensor 68 disables the code 1 circuit via switch S3, thus requiring the code 2 circuit to be activated. Without knowing what to do under such circumstances the carjacker will abandon the car, especially when a loud siren is activated in a place which likely is not in an isolated location but, rather, a random place which probably is well populated.

If the carjacker takes the car after both security codes are entered, the driver secretly activates the reset button S5 which, after a time delay, results in stopping the engine. The occurrence of this unexpected event combined perhaps with an alarm being sounded at such time encourages the carjacker to abandon the car rather than to search for other means to bypass the anti-theft system. In the meanwhile, the car is still within easy reach of the driver who can quickly recover it.

Switch S7 is in circuit between delay circuit 118 and alarm 74 in order to prevent alarm 74 from going off after the delay interval expires. In other words, the delay times out regardless of what the driver does. Without switch S7 the alarm would go off each time the car is started. Consequently, normally closed switch S7 is opened by the output signal of switch S4 which, as explained above, occurs when comparator 104 detects a matching code 2. Thus, if code 2 is entered, actuation of alarm 74 is inhibited.

A switch S8 is also in-circuit with warning device 72. It, like switch S7, is normally closed and is controlled by the status of the output of comparator 104 and switch S4. Thus, when code 2 is detected by comparator 104, this results in warning device 72 being inhibited from further operation.

An optional override switch S6 for the code 1 portion of the system permits the code 2 portion to be activated if the car is stolen while in the override mode. For example, a parking attendant would not be expected to drive the car several miles. This distance can be set or some other desired value in the odometer reference generator. The parking attendant can start the car numerous times without needing to know either of the two codes. If a carjacker takes the car and drives it further than the set distance, the car is disabled when code 2 is not punched in, and the carjacker is encouraged to abandon the car by the sounding of alarm 121, for example. Providing an override switch avoids the necessity to compromise the code 1 portion of the circuit to people not well known to the driver, such as attendants in a parking lot.

Another benefit of switch S6 is when the car is given to a friend to drive with permission. The friend must be told code 2. By activating switch S6, however, the friend need not be told of code 1. This provides an added measure of security in case the friend lets it slip to someone that code 2 is required and reveals what it is. When the car is returned to the owner and switch S6 is deactivated, code 1 is required, but this remains unknown to everyone but for the owner. However, with this arrangement the fact that code 2 remains active and is not bypassed allows the friend to take advantage of reset button S5 to prevent the carjacking, as described above.

Although details of the invention have been provided above, various modifications thereto will be readily apparent to one with ordinary skill in the art. For example, the second embodiment can be responsive to the later occurring one of expiration of a time delay and traversal of a set distance in a reset mode, just as is done for the first embodiment. Also, the various preset parameters can be factory preset. In addition, the reset mode need not be initiated by a button. Any unit can be used from a mechanical one, to infrared where a beam of light can be broken, and even to acoustic. Also, the second embodiment can rely on stopping the supply of fuel to the engine rather than on controlling engine ignition. These and all other such modifications are intended to fall within the scope of the present invention as defined by the following claims.

I claim:

1. A motorized-vehicle anti-theft security system for precluding unauthorized engine operation, comprising:

engine enabling code means responsive to an encoded input signal for enabling operation of an engine of a vehicle;

manually operated switch means placed in the vehicle for selective operation only by a driver of the vehicle after the engine is enabled by said engine enabling code means; and engine disabling means responsive to activation of said switch means for producing a signal to disable the operation of said engine and for requiring inputting of another encoded input signal to said engine enabling code means, before engine disablement occurs, in order for operation of said engine to continue without interruption after occurrence of said activation of the manually operated switch means.

2. The system of claim 1, wherein said engine enabling code means includes first and second code means having respective first and second codes, each for independently enabling the operation of said engine, said engine disabling means disabling said engine unless said second code means is enabled subsequent to the enabling of the engine by the first code means, wherein said encoded input signal is said first code, and said another encoded input signal is said second code.

3. The system of claim 2, wherein said engine disabling means includes means for automatically disabling the first code means after the vehicle has traveled a preset distance from its location at which the first code means is enabled, and means for bypassing the disabled first code means when the second code means is enabled in response to inputting of said second code.

4. The system of claim 2, wherein said engine disabling means disables the engine within a preset time delay after activation of said switch means unless said another encoded input signal is inputted before the time delay expires.

5. The system of claim 2, wherein said switch means is coupled to said second code means for further causing the second code means to output a signal causing said engine disabling means to disable said engine, and wherein said another encoded input signal required to operate said engine after occurrence of said activation is said second code.

6. The system of claim 1, wherein said manually operated switch means is placed in the passenger compartment of the vehicle.

7. The system of claim 2 including manual switch override means for selectively overriding the need for inputting said first code to the first code means such that said engine disabling means remains operative for disabling the engine after the vehicle has traversed a preset distance from its position when the switch override means is activated.

8. The system of claim 1, further comprising alarm means responsive to the engine disabling means for producing at least one of an acoustic and visual alarm as the engine is disabled.

9. The system of claim 1, further comprising driver warning means coupled to said engine disabling means for warning the driver that the engine is about to be disabled.

10. The system of claim 1, wherein the manually operated switch means includes delay means for delaying the disabling of said engine for a selective delay period.

11. An automobile anti-theft security system for precluding unauthorized engine operation, comprising:

first engine enabling code means responsive to a first encoded input signal for enabling operation of an engine of an automobile;

engine disable means for disabling said engine after a predetermined time delay;

second engine enabling code means for overriding said engine disable means in response to an occurrence of a second encoded input signal within said predetermined time; and manually operated switch means for selective operation by a driver of said automobile after the engine is enabled by both said first and second engine enabling code means, said switch means including first delay means responsive to activation of said switch means for delayed disablement of the operation of said engine after it has been enabled in order to require entry of said second encoded input signal to said second engine enabling code means for enabling continued operation of said engine after occurrence of said activation of the switch means.

12. The system of claim 11, wherein said engine disable means includes second delay means for disabling the engine after said predetermined time delay which begins after operation of the engine has been enabled by the first engine enabling code means.

13. The system of claim 12, wherein said second delay means for disabling the engine after said predetermined delay includes distance sensing means for detecting the distance travelled by said automobile after said first engine enabling code means is enabled, and means responsive to said distance sensing means for disabling the operation of said engine by said first engine enabling code means.

14. The system of claim 11 including distance sensing means for generating a distance signal indicative of the distance traveled by said automobile after enablement of the engine by said first engine enabling code means, said system including inhibit means responsive to said distance signal for inhibiting the enablement of said engine operation by said second engine enabling code means before travel of the automobile for a predetermined distance has been detected by said distance sensing means.

15. The system of claim 14, wherein said inhibit means includes means responsive to said distance sensing means and the enablement of said first engine enabling code means for enabling operation of said engine by said second engine enabling code means.

16. The system of claim 11, wherein said second engine enabling code means overrides said engine disabling means only if said second encoded input signal occurs after the first encoded input signal.

17. An anti-theft method for an automobile comprising the steps of:

entering a first code for enabling the operation of an automobile engine;

automatically disabling said engine after a certain delay from when the first code has been entered;

entering a second code after the engine has been enabled by the first code to block said step of automatically disabling said engine to thereby continuously operate the engine; and selectively activating by the driver of the automobile the step of automatically disabling said engine as it is being continuously operated, so that disablement of the engine occurs unless said second code is entered.

18. The method of claim 17, wherein the step of entering the second code includes entering a code different than the first code.

19. An anti-theft method for an automobile, comprising the steps of:

enabling operation of an automobile engine by manually manipulating a first device by a driver to produce an engine enablement signal for causing the engine to operate continuously; and selectively actuating a second device in the automobile only by the driver of the automobile to disable further continuous operation of the engine unless, before engine disablement occurs, said first device is manipulated by the driver to produce said engine enablement signal.

20. An anti-theft method for an automobile, comprising the steps of:

producing a control signal by the driver of the automobile for operating an automobile engine continuously in a normal operating mode; and selectively actuating a device in the automobile only by the driver for disrupting said normal operating mode unless, before disruption of the normal operating mode occurs, a predetermined operation is manually performed by the driver.

* * * * *